United States Patent [19]
Leif et al.

[11] Patent Number: 5,696,688
[45] Date of Patent: Dec. 9, 1997

[54] METHOD AND APPARATUS FOR WELDING HANDLE STUDS TO COOKING VESSELS

[75] Inventors: David Peter Leif; Philip Brian Platteter, both of Manitowoc; Kevin Robert Claerbaut, Waldo; Thomas John Haug; Michael Lee Pietrowski, both of Manitowoc, all of Wis.

[73] Assignee: Newell Operating Company, Ill.

[21] Appl. No.: 593,225

[22] Filed: Jan. 29, 1996

[51] Int. Cl.⁶ .................................................. G06F 19/00
[52] U.S. Cl. .......................... 364/468.24; 364/472.01; 16/110 A
[58] Field of Search ............ 364/468.24, 472.01–472.13, 364/478.01, 478.05, 478.06; 220/752, 759, 912, 758; 16/110 R–110 A; 228/136; 29/509, 522.1

[56] References Cited

U.S. PATENT DOCUMENTS

| | | |
|---|---|---|
| 3,691,605 | 9/1972 | Witte ................................. 403/14 |
| 4,127,914 | 12/1978 | Fischbach ........................ 16/110 A |
| 4,413,767 | 11/1983 | Hellinger ............................ 228/136 |
| 4,565,296 | 1/1986 | Lam ..................................... 220/752 |
| 5,462,195 | 10/1995 | Marti ................................... 220/752 |

*Primary Examiner*—James P. Trammell
*Attorney, Agent, or Firm*—Foley & Lardner

[57] ABSTRACT

An improved method and apparatus for attaching metal studs to a pre-finished metal shell is provided for use in the manufacture of cookware. Specifically, a metal cookware shell with a logo disposed on the bottom surface thereof is provided with a mark for indicating the location where a stud is to be welded for attachment of the handle. An apparatus and method are provided for detecting the location of the mark, milling the mark and exterior finish off the shell, welding the stud to the milled portion of the shell and testing the strength of the stud/shell weld, all with a minimum contribution of manual labor.

10 Claims, 8 Drawing Sheets

METHOD AND APPARATUS FOR WELDING HANDLE STUDS TO COOKING VESSELS

This invention relates generally to the manufacture of cookware. More specifically, this invention relates to the automated attachment of a stud to a cooking vessel shell which replaces numerous manual steps required in prior art manufacturing methods.

BACKGROUND OF THE INVENTION

Despite the development of automated and computerized manufacturing systems, manual labor is one of the highest costs incurred by manufacturers. The use of manual labor and the costs associated therewith still remain one key area where most manufacturers have an opportunity to reduce costs. Simply put, by reducing the amount of manual labor used to manufacture a product, the manufacturer will reduce the cost of manufacturing the product, even if the reduction of manual labor involves the design, purchase and/or implementation of a machine to perform tasks that were once performed manually. In the long run, machines are cheaper than people and the less people involved in the manufacture of a product, the cheaper the product is to manufacture.

This situation is especially true in the manufacture of cookware. Metal cookware items consist primarily of two parts—a metal shell which accommodates the food and a handle which is attached to the shell. The handle is attached by way of a stud, which is welded or otherwise attached to the exterior surface of the shell.

In manufacturing processes taught by the prior art, an unfinished metal shell is manually picked up off a conveyor line and placed at a welding station. At the welding station, the operator welds the metal stud to the metal shell. Subsequently, at a separate "torque test" station, the weld is tested manually by the operator by applying a torque or a twisting motion to the welded stud to ensure that the weld between the shell and the stud can withstand the torque imposed on the handle during normal use, i.e., when a user is holding a piece of cookware that is full of food by its handle. If the weld is deemed satisfactory, the handle is then attached to the stud.

In the process outlined above, the pan must be removed manually from the conveyor line before it is manually transferred to the welding station. Finally, the weld must be tested manually and then the pan must be replaced manually back on to the conveyor line before it proceeds on to the finishing operation.

Clearly, there is a strong need for an improved method for carrying out the above-described steps in an automated fashion, with substantially less reliance on manual labor. Further, there is a strong need for an apparatus to carry out the above steps in an automated fashion, without substantial reliance upon manual labor.

SUMMARY OF THE INVENTION

The invention provides an improved method of manufacturing cookware which is less reliant upon manual labor than methods taught by the prior art. Further, the invention provides an improved apparatus for manufacturing cookware in an automated fashion with less reliance on manual labor than apparatus taught by the prior art.

The improved method of manufacturing cookware can be summarized as follows. The method of the present invention begins with a finished shell. That is, a shell that is ready for sale with the exception of the attachment of a handle. Specifically, the shell may already include a porcelain or other exterior finish on its exterior surface and a non-stick finish on its interior surface if these features are so desired. The exterior bottom surface of the shell may also include the manufacturer's logo or trademark. If so, the handle should be attached at a specific location on the shell so that the handle is perpendicular to the logo or trademark or so that the position of the handle compliments the position of the logo or trademark disposed on the bottom of the shell.

The shell will therefore include an exterior mark at the position where the stud is to be welded (and the handle attached). The shell is transported to a sensor which is used to determine the location of the mark. Preferably, the shell is rotated so that the exterior surface of the shell rotates in front of the sensor which enables the sensor to determine the location of the mark. The shell is then mechanically transported to a milling apparatus where the mark, and the exterior finish are milled off of the exterior of the shell. The shell is transported so that the pan need not be shifted or rotated once it is received at the milling apparatus. At the milling apparatus, the mark and the exterior finish are ground off of the exterior of the shell. The shell is then transported, while maintaining the proper alignment of the milled portion of the shell, to the welding station. At the welding station, the stud is mechanically welded to the milled spot on the exterior of the shell. The shell is then transported to the "torque test" station where a torque is applied to the welded stud to ensure that it will withstand the rigors of everyday use.

The apparatus for carrying out the above-referenced method can be summarized as follows. A conveying means is used to transport the shell to a first means for sensing the presence of the shell. Once the shell arrives at the apparatus and is sensed by the first means for sensing the presence of the shell, a means for lifting the shell engages the shell and lifts it off the conveying means. A second means for detecting the location of the mark is extended toward the shell. The shell is then rotated by a means for rotating the shell so that the exterior surface of the shell is rotated in front of the means for detecting the location of the mark. After the location of the mark is detected, the rotation of the shell is stopped and transported to the means for milling the exterior of the shell.

In the preferred embodiment, a single means for transporting the shell amongst the three primary work stations is provided in the form of a rotatable or indexing table. (As noted above, the three primary work stations are (1) the means for milling the exterior of the shell, (2) the means for welding the stud on to the shell and (3) the means for applying torque to the studs.) After the shell arrives at the apparatus and the location of the mark is detected, the indexing table is rotated so that the shell is transported to the means for milling the exterior of the shell. At this point, the shell has been maintained in the proper alignment and therefore the means for milling is extended forward to engage the mark whereby the mark and the exterior finish underneath the mark is milled off of the exterior of the shell. The milling instrument is withdrawn and the indexing table is rotated so that the shell is transported to the welding station where a stud is welded to the shell at the location where the mark and the finish have been milled off of the shell. The indexing table is then rotated again and the shell is transported to the means for applying torque to the stud. At this station, a twisting force or torque is applied to the stud to ensure that the stud will withstand normal use. After the "torque test", the indexing table is rotated again and the shell is deposited onto the conveying means which transports the shell to the next assembly station where the handles are attached to the shells.

It is therefore an object of the present invention to provide an improved method of manufacturing cookware with reduced reliance upon manual labor.

Yet another of the present invention is to provide an improved apparatus for manufacturing cookware which provides an overall reduction in the amount of manual labor required.

Still another object of the present invention is to provide an improved method of attaching a stud to a metal cookware shell.

Another object of the present invention is to provide an improved apparatus for attaching metal studs to cookware shells.

Other objects and advantages of the invention will become apparent upon reading the following detailed description of the drawings and appended claims, and upon reference to the accompanying drawings.

BRIEF DESCRIPTION OF THE DRAWINGS

The invention is illustrated more or less diagrammatically in the accompanying drawings wherein.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE DRAWINGS

Like reference numerals will be used to refer to like or similar parts from Figure to Figure in the following description of the drawings.

Figure 1:
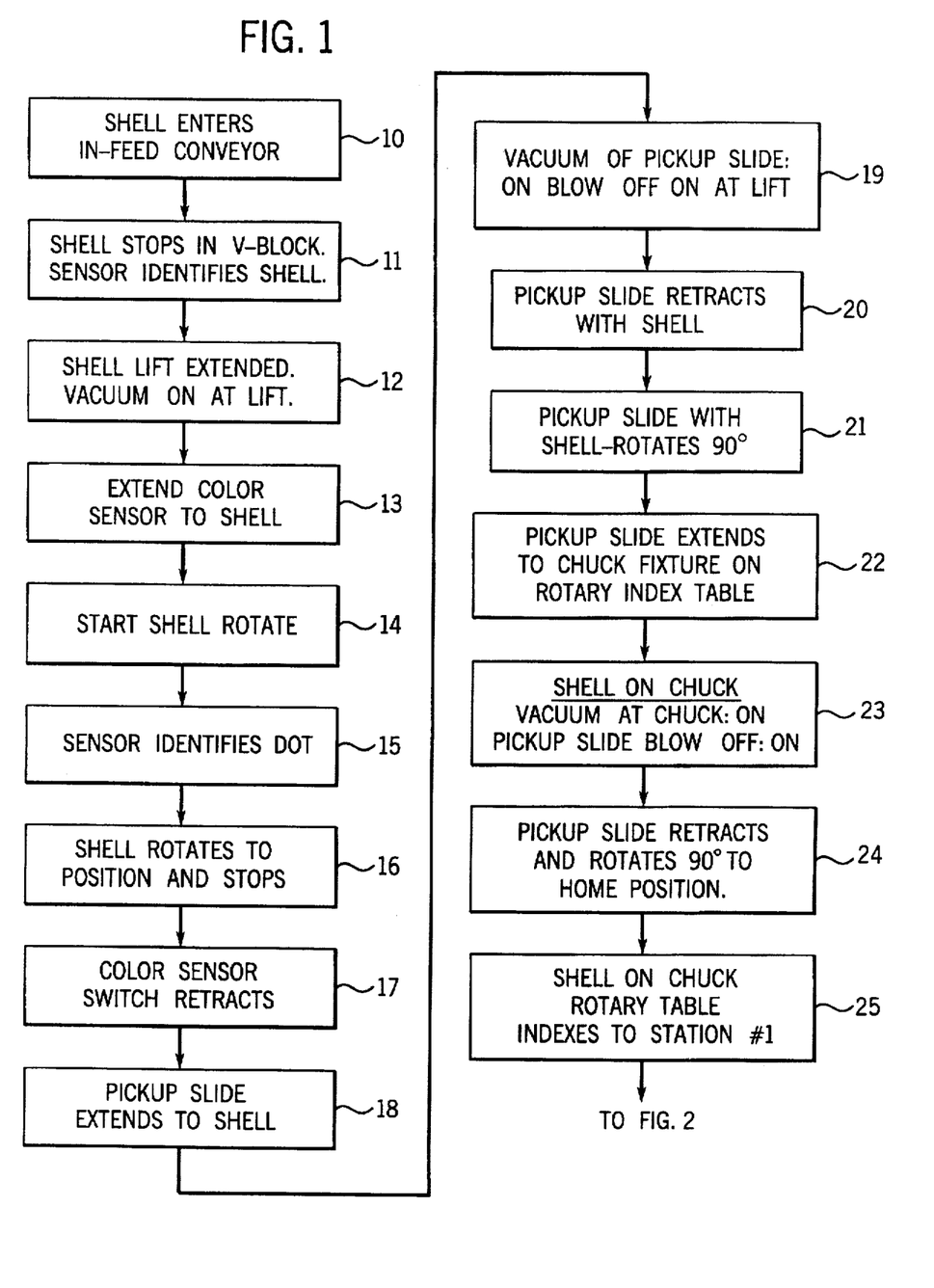
FIG. 1 is a flow diagram illustrating a portion of the process used to manufacture cookware made in accordance with the present invention.
Figure 2:
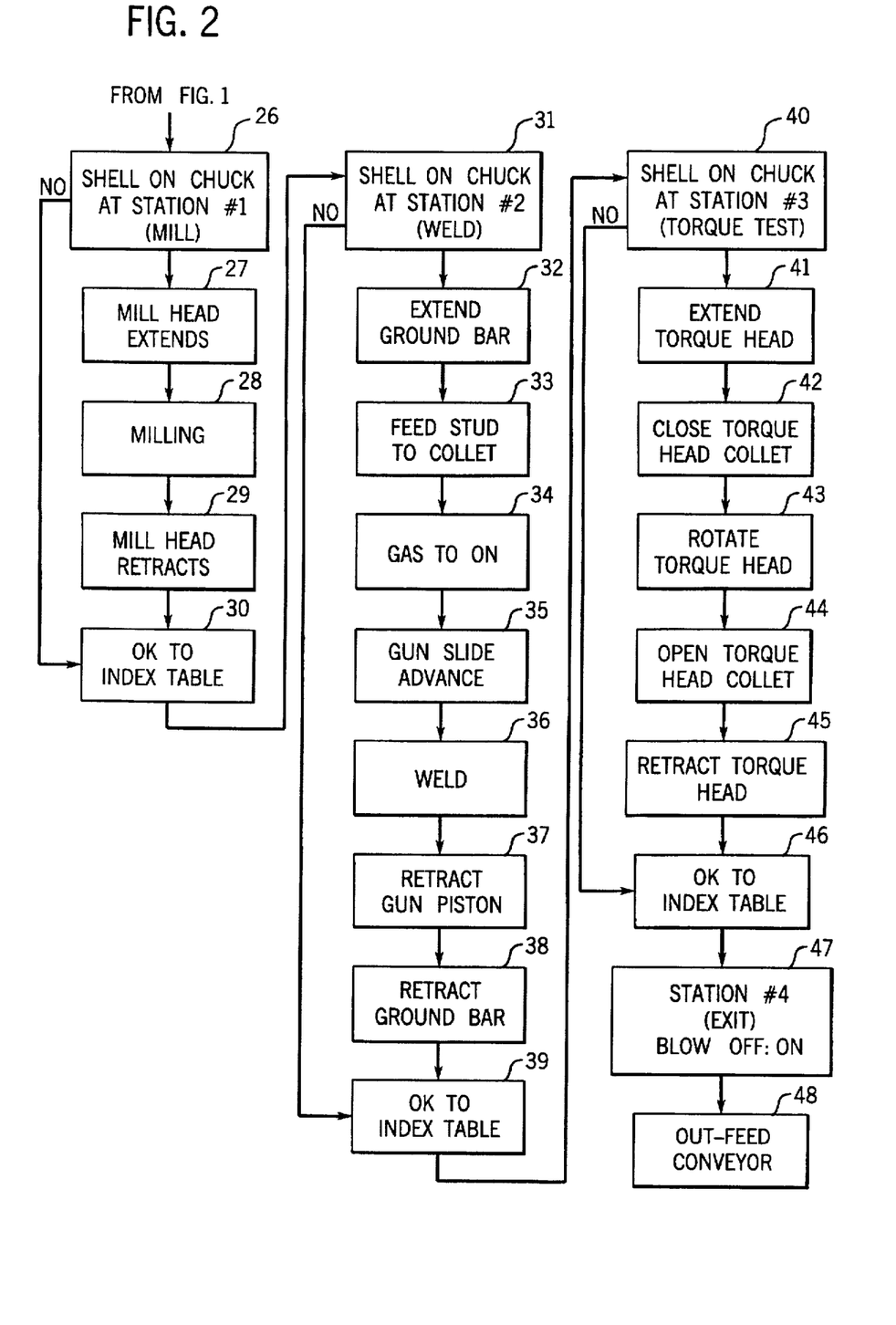
FIG. 2 is a flow diagram illustrating a portion of the process used to manufacture cookware in accordance with the present invention.

FIGS. 1 and 2 provide an overall flow diagram of a method of manufacture provided by the present invention.

Figure 10:
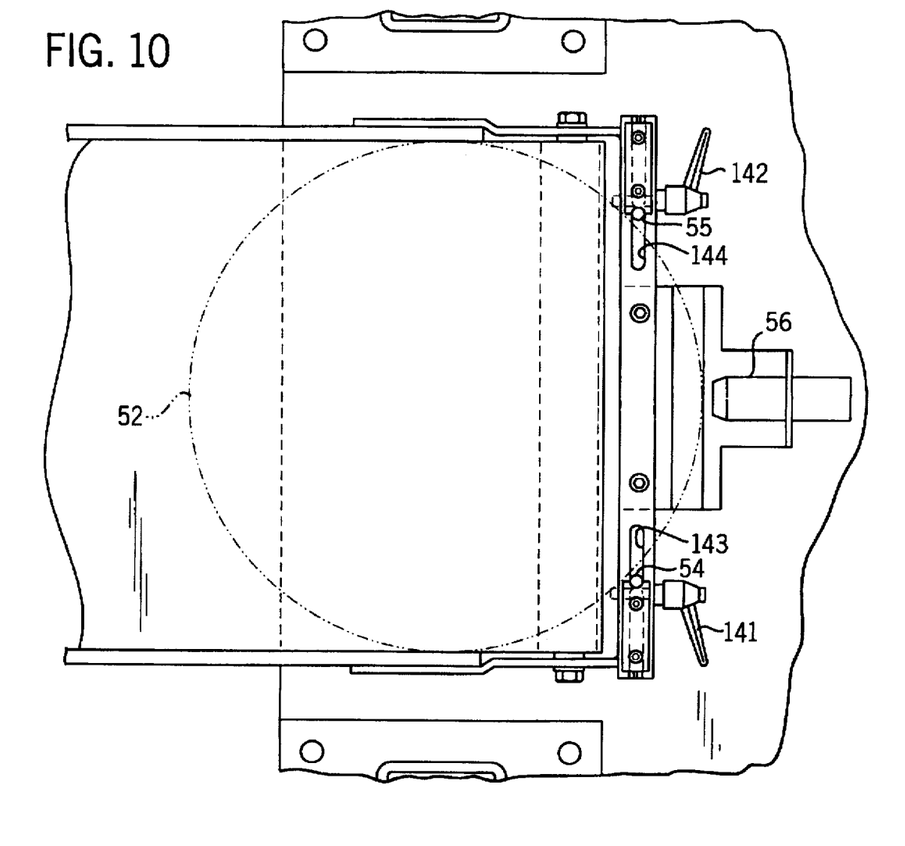
FIG. 10 is a partial plan view of the end of the conveyor that delivers shells to the apparatus for welding studs onto the shells.
Figure 11:
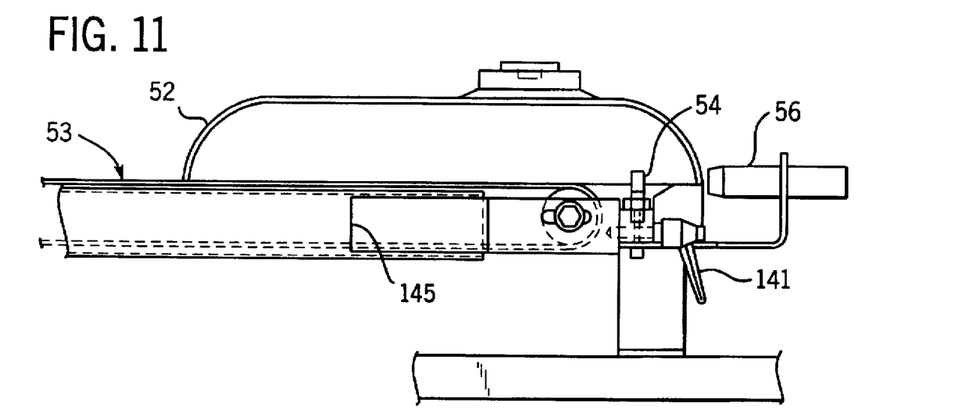
FIG. 11 is a side elevational view of the apparatus shown in FIG. 10.

Referring first to FIG. 1, a shell enters the in-feed or input conveyor at step 10 before it is blocked or stopped at the v-block portion of the manufacturing apparatus at step 11. As shown in FIG. 10, the preferred means for stopping the shell includes adjustable stop pins. At step 12, the pan is lifted off of the conveyor by a chuck equipped with a vacuum line that provides a suctional engagement between the shell and the chuck. At step 13, a color sensor is extended toward the outside surface of the shell. As noted above, the outside surface of the shell is coated with a exterior finish. The manufacturer's logo is printed on the bottom of the shell, by a silk screen or other suitable process. For aesthetic purposes, it is desirable to attach the handle in a perpendicular or other aesthetically satisfying relationship with respect to the manufacturer's trademark or logo. Therefore, in order to attach the handle so that the handle is perpendicular or otherwise to the manufacturer's logo, a mark is placed on the pan to mark the location where the stud should be welded. The color sensor will be able to detect the location of the mark on the exterior surface of the shell.

Accordingly, at step 14, the shell is rotated in front of the color sensor. At step 15, the sensor identifies the location of the mark or dot. At step 16, the shell is rotated so that it is in the correct position. At step 17, the color sensor is retracted. It will be noted that the color sensor can be attached to a movable arm or other structure so that it can be extended toward the shell and retracted after the location of the mark is detected. Alternatively, the color sensor can be mounted to a stationary structure if the design of the apparatus is such that the shell or lift apparatus will not engage or strike the color sensor.

At step 18, the pick-up slide extends downward to pick the shell up or off of the lift. The pick-up slide is equipped with a vacuum line and, at step 19, a vacuum is applied to assist in the engagement between the slide and the shell. At step 20, the pick-up slide, with the shell, is retracted and then rotated at step 21, and then extended toward a waiting chuck fixture on the rotary index table at 22. With the shell engaging the chuck facing, a vacuum is drawn through the vacuum line at step 23 which ensures a proper engagement between the chuck and the shell. Once the vacuum is applied through the line in the chuck at step 23, the pick-up slide is retracted at step 24 and returns to its home position for the next oncoming shell. The shell is now mounted on the chuck which is attached to the rotary index table which is rotated at step 25 before stopping at the milling station at step 26.

The millhead extends downward toward the shell at step 27 and, simultaneously, a clamp and clamp extension shaft extends toward the shell to ensure its position on the chuck face. The exterior of the shell, at the mark, is milled at step 28 before 25 the millhead is retracted at step 29.

In the preferred embodiment, a plurality of chucks are disposed on the rotary index table. In one preferred embodiment, discussed below and illustrated in FIG. 3 and 7–9, six chucks are disposed on the rotary index table and at least three shells may be disposed on different chuck faces at any given time. In the event a shell is not disposed on the chuck at step 26, the millhead is not extended at step 27 but, instead, the table is simply rotated at step 30.

If a shell is detected on the chuck at the welding station, the ground bar is extended at step 32, a stud is collected automatically at step 33 and fed to the collet which places the stud against the milled portion of the shell. The gas supplied to the welder at step 34 and the welding gun is advanced at step 35. The welding operation takes place at step 36, the welding gun is retracted at step 37 and the ground bar is retracted at step 38. The index table is rotated at step 39 so that the pan with the stud welded thereto arrives at the torque test station at step 40. The torque head and hold-down clamp are simultaneously extended at step 41. The torque head is closed around the stud at step 42 and a torque is applied to the stud at step 43. The torque head is released at step 44, retracted at step 45 and the index table is rotated at step 46.

Again, if there is no shell disposed on the chuck at steps 31 (welding station) or 40 (torque test station), the index table is simply rotated at steps 39 and 46 respectively.

After the weld of the stud is tested at step 43 and the table is rotated at step 46, the shell with the stud welded thereto, arrives at the blow off station at step 47. The vacuum applied through the chuck is released and air pressure, sufficient to blow the shell outward off of the chuck is applied and the shell drops off of the chuck onto the out-feed conveyor at step 48.

Figure 3:
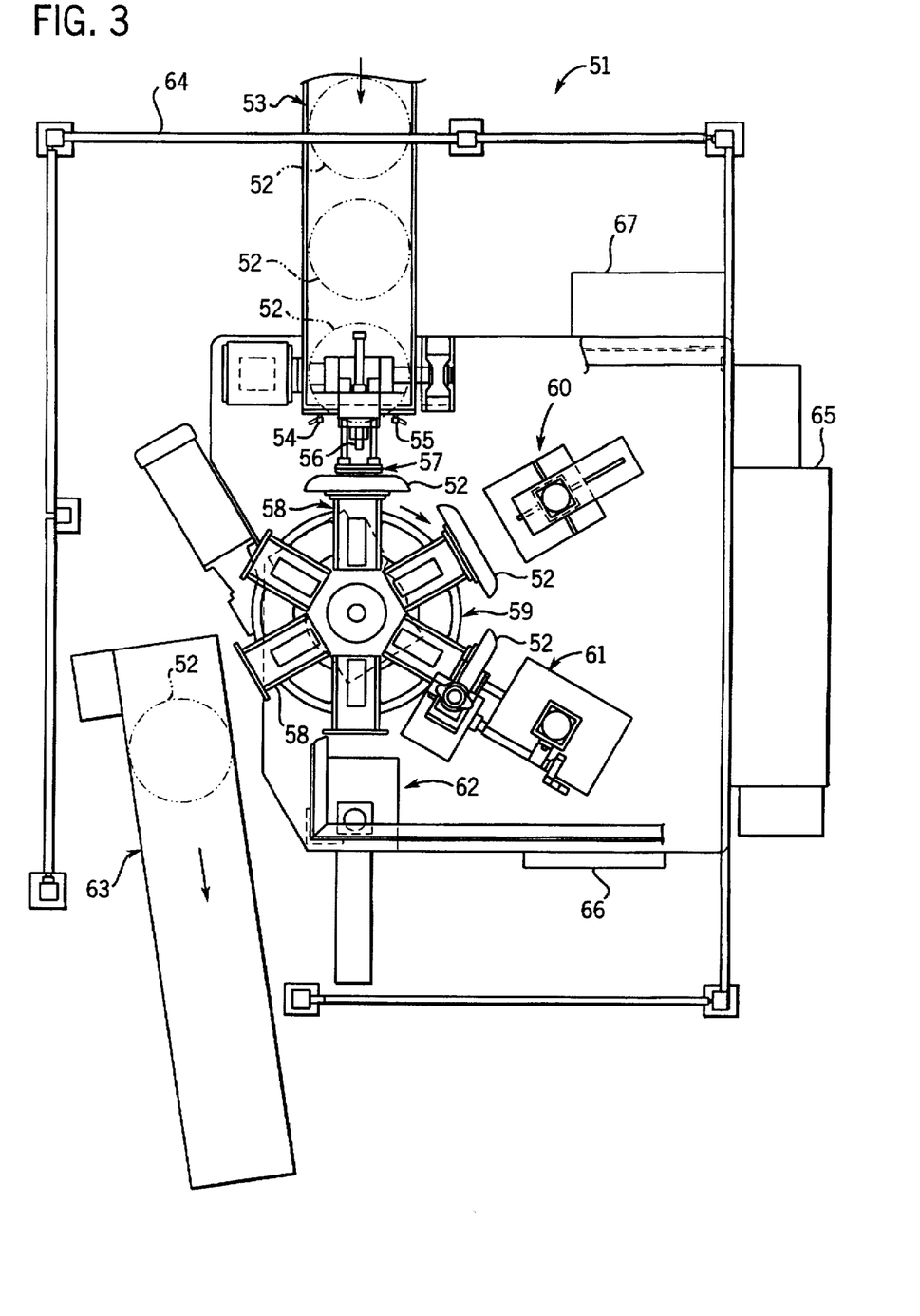
FIG. 3 is a plan view of an apparatus used to manufacture cookware in accordance with the invention.

Turning now to FIG. 3, the plan view of the apparatus 51 is provided. The shells shown in phantom at 52 are transported into the milling/welding/testing area by the in-feed conveyor 53. The shells are stopped by the adjustable stop pins shown at 54, 55 or alternative arrangement such a v-block. A proximity sensor 56 detects the presence of a shell at this entry point. The shell 52 is then lifted off of the conveyor 53 by a lift mechanism disposed underneath the conveyor (not shown) and, simultaneously, the color sensor (not shown) extends toward the shell 52 for purposes of detecting the mark (not shown). The lift mechanism (not shown) rotates the shell so that the exterior of the shell rotates in front of the color sensor which thereafter detects the presence of the mark. Once the presence of the mark is detected (step 15), the lift mechanism continues to rotate the shell to the appropriate position and stops (step 16). The pick-up slide apparatus then extends to the shell to pick the shell up before it places the shell onto the chuck fixture 58 (see steps 18–23). The index table 59 is then rotated to the milling station 60. After the milling operation is carried out (see steps 26–29), the table 59 is rotated again and the shell 52 arrives at the welding station 61. After the welding steps are carried out (see steps 31–38), the table 59 is rotated again and the weld of the stud to the shell is tested at the torque test station 62. After the strength of the weld or bond between the stud and shell is tested at the torque test station 62 (see steps 40–45), the table 59 is rotated again and the shell 52 is blown off of the chuck fixture 58 and onto the out-feed conveyor 63 (see step 47).

The indexing table 59 carries six chuck fixtures, each shown at 58. The structure 64 serves as a suitable boundary for the apparatus 51. Most electrical components are contained in the housing 65. The vacuum pump enclosure is shown at 66. The valve bank is shown at 67.

Figure 4:
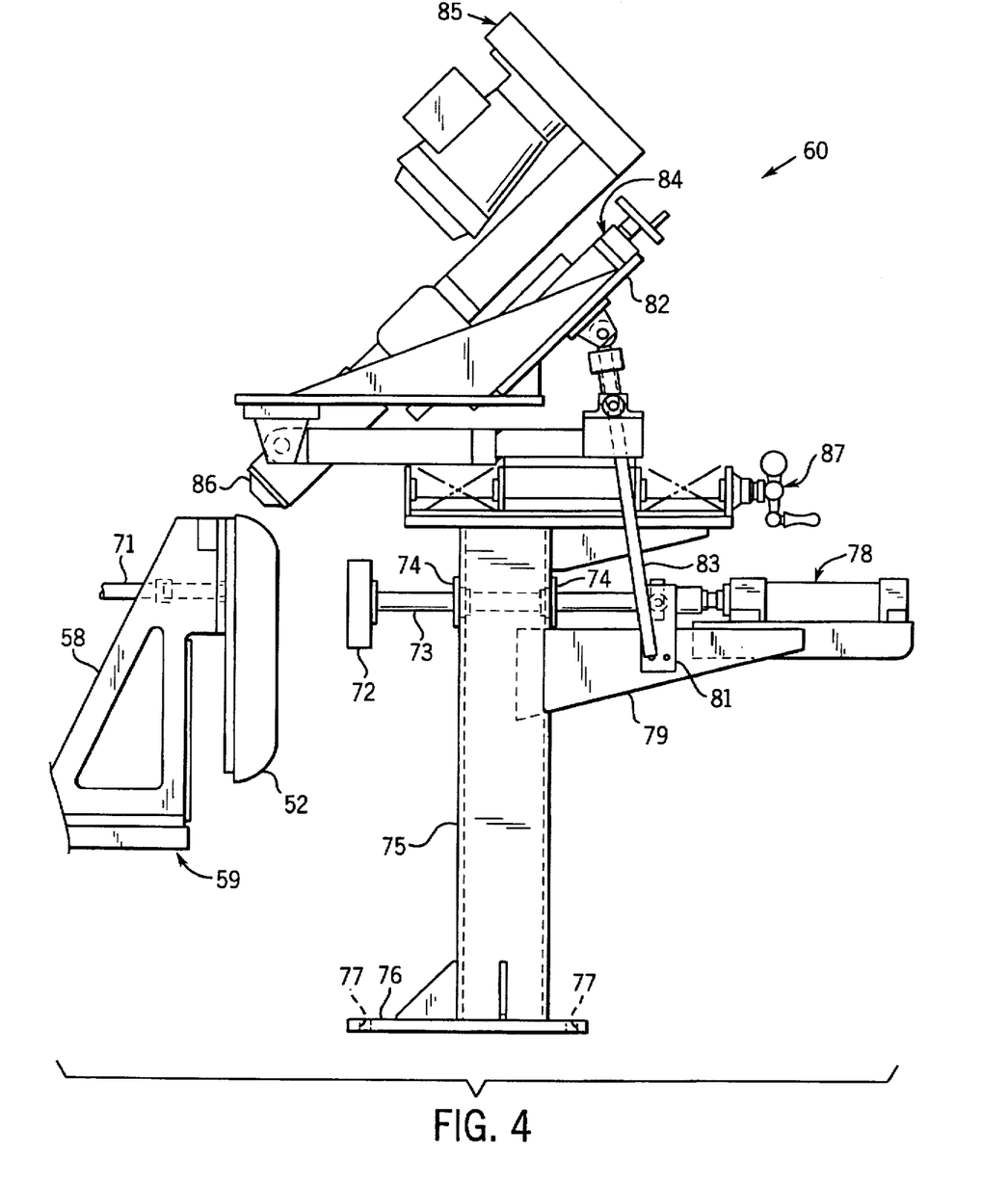
FIG. 4 is an elevational view of a milling station made in accordance with the present invention.

Turning to FIG. 4, the milling station 60 is shown in greater detail. The shell 52 is transported to the station 60 by the chuck fixture 58. The chuck fixture 58 is equipped with an air line 71. In the position shown in FIG. 4, a vacuum is being drawn through the line 71 so that the shell 52 is sucked up against the chuck face (not shown). A hold down clamp 72 is pushed outward toward the shell 52 by the shaft 73. The clamp 72, in combination with the vacuum drawn through the air line 71, ensures that the shell 52 maintains its position on the chuck facing during the milling operation. Gaskets are provided at 74 25 to support the shaft 73 as it passes through the pedestal 75. The pedestal 75 is mounted to the floor (not shown) by bolts (not shown) that pass through its base structure 76 via the holes shown at 77. The shaft 73 and clamp 72 are extended are retracted with the pneumatic cylinder 78. The arm 79 supports the cylinder 78 by way of the bracket 81. The support bracket 82 supports the unislide 84 and milling apparatus shown generally at 85. The configuration of the milling station 60 is adjustable by way of the unislide 84, the adjustable clamp 87 and the adjustable arm 83.

When the chuck fixture 58 is in the appropriate position, and the hold-down clamp 72 is extended to engage the shell 52. Simultaneously, the mill head 86 is extended downward to grind off the mark and exterior finish from the shell 52.

Figure 5:
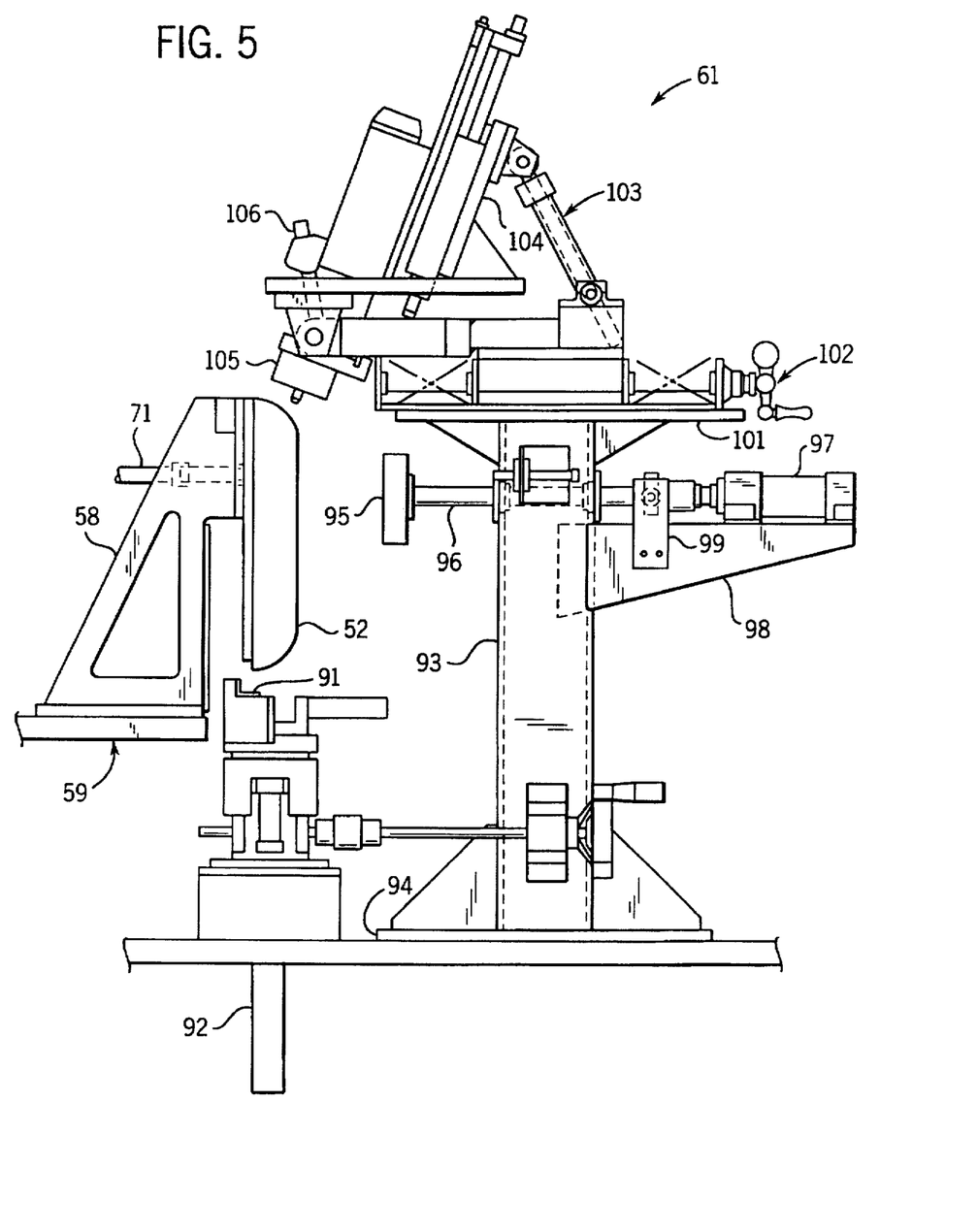
FIG. 5 is a elevational view of a welding station made in accordance with the present invention.

Turning to FIG. 5, a more detailed view of the welding station 61 is provided. The index table 59 has been rotated so that the chuck fixture 58 and shell 52 have arrived at the welding station 61. At this point, the shell 52 has been milled at the mark (not shown) so that the mark and exterior underneath have been ground off thereby exposing clean metal to which a stud will be welded. After the shell 52 arrives at the station 61 (see step 31), the ground strap 91 is extended upward to engage the shell 52. Like the milling station 60, the welding station is also supported by a pedestal 93 and base 94. A hold down clamp 95 extends outward to engage the shell 52 to hold shell 52 firmly in place during the welding operation. The clamp 95 is supported by a shaft 96 which is extended outward by the pneumatic cylinder 97. The arm 98 and bracket 99 support the cylinder 97. The welding apparatus is supported by the platform 101 and its position may be adjusted by the clamp 102 and adjustable arm 103. The adjustable arm 103 is also typically connected to the support bracket 104.

After the shell 52 arrives at the station 61 (see step 31), the ground bar 91 is raised to engage the shell 52 (see step 32) and a stud (not shown) is fed down into the collet 106 (see step 33). The gas supply to the welding gun 105 is then turned on (see step 34), the welding gun 105 is advanced downward to the shell 52 (see step 35) and a stud (not shown) is welded to the shell 52 (see step 36). The gun 105 and ground bar 91 are then retracted (see steps 37, 38).

Figure 6:
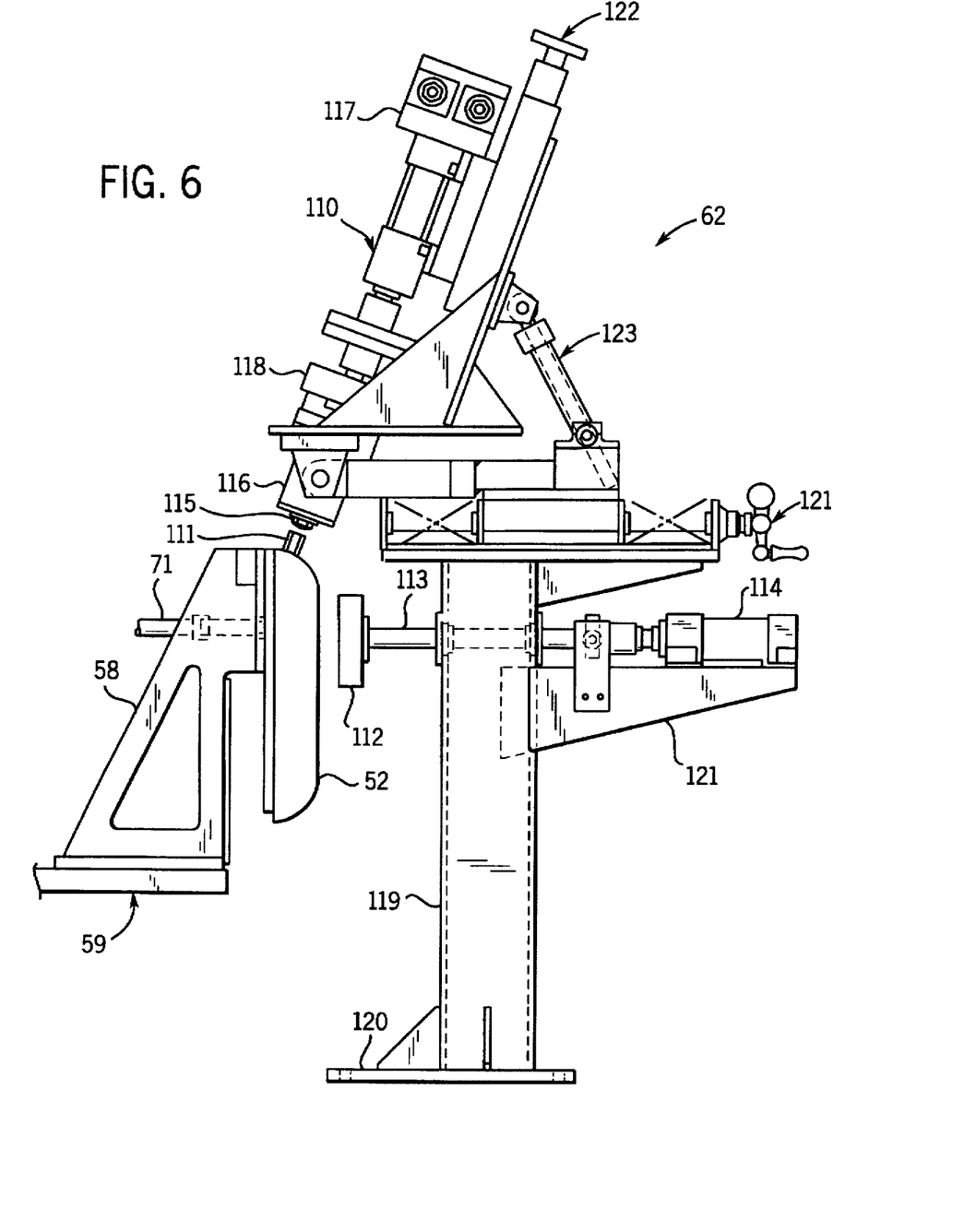
FIG. 6 is a elevational view of a torque testing station made in accordance with the present invention.

Turning to FIG. 6, a shell 52 with a stud 111 welded thereto has arrived at the torque test station 62. The hold-down clamp is extended toward the shell 52 by way of the shaft 113 and pneumatic cylinder 114 to securely hold the shell 52 in place as the stud 111 is twisted by the collet 115. The collet 115 is twisted by a collet guide (not shown) which is contained within the housing or body 116. The twisting action is provided by a spring disposed in the housing 117 which imparts a twisting action to a series of shafts disposed above the actuator 118 which imparts a twisting force to the collet guide (not shown) 25 and ultimately to the collet 115. In the preferred embodiment, a force of approximately 75 inch pounds is imparted to the stud 111.

Similar to the weld station 61 and milling station 60, a pedestal 119 supports the apparatus as equipped with a base 120 which is bolted to the floor (not shown). An arm 121 supports the cylinder 114 and shaft 113. The position of the torque testing apparatus 110 may be adjusted by way of the clamps 121 and 122 as well as the adjustable arm 123.

Figure 7:
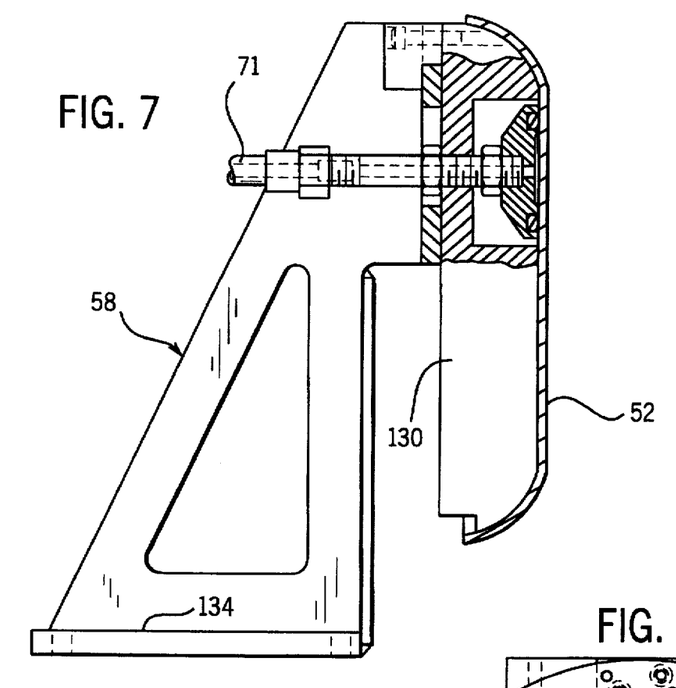
FIG. 7 is a side sectional view of a chuck support fixture made in accordance with the present invention.
Figure 8:
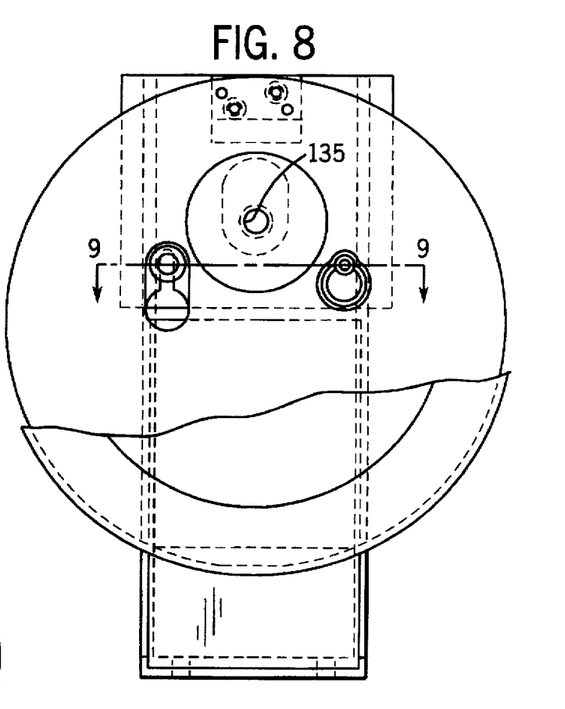
FIG. 8 is a elevational view of the chuck support fixture shown in FIG. 7.
Figure 9:
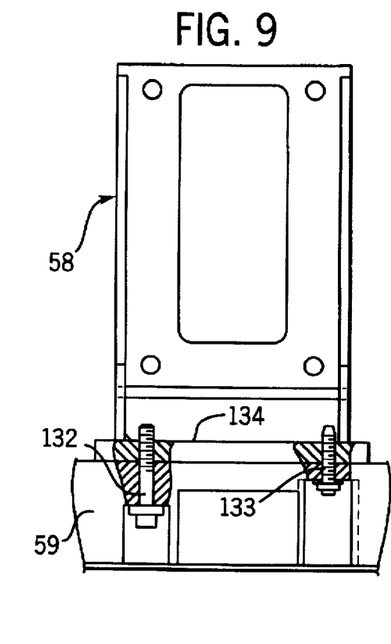
FIG. 9 is a front sectional view of the chuck support fixture shown in FIG. 7.

Turning to FIGS. 7, 8 and 9, a more detailed illustration of the chuck support fixture 58 and chuck 130 is provided. The chuck 130 is designed to snugly accommodate a shell 52. Different chucks are used for different shaped shells. The chuck support fixture 58 is attached to the indexing table 59 by bolts 132, 133 which pass through the base of the chuck support fixture 58. The air hose 171 is used both for vacuum and blow-off operations. When a shell 52 is to be mounted for transport on the chuck 130, a vacuum is applied through the line 71 to secure the shell 52 on the chuck 130. After the stud 111 is tested at the torque testing station 62, the indexing table 59 is rotated and then the shell 52 is "blown-off" onto the out-feed conveyor 63. In this step, the supply of pressurized air is passed through the line 71 and out the aperture 135 which blows the shell 52 outward onto the out-feed conveyor 63 (see FIG. 3).

Turning to FIG. 10, the pan is received in the apparatus 51 (see FIG. 3) by engaging the adjustable stop pins 54, 55. The pins 54, 55 may be adjusted by loosening the wing nuts 141, 142 and sliding the pins along the elongated aperture 143, 144. The presence of the shell 52 is detected by the proximity sensor 56.

The shell lift (not shown) extends through the conveyor 53 at the opening 145. Thus, when the shell 52 engages the pins 54, 55 and is detected by the sensor 56, a lift mechanism extends upward through the gap 145 to lift the pan upward in front of the color sensor (not shown). A vacuum is provided in the lift mechanism (not shown) so that it may rotate the shell 52 in front of the color sensor without the shell 52 being dislodged from the lift mechanism.

Thus, an improved method of attaching a metal stud to a prefinished metal shell is provided with a minimum of manual labor. Previously, the shell would be placed at the welding station manually, the studs would be fed manually and the torque test would be performed manually. Further, because the pans were handled between stations by manual laborers, pre-finished pans were not provided because the studs, and therefore the handles, would often be attached at the wrong place thereby not providing the correct perpendicular or other geometric relationship with respect to the logo that is disposed on the bottom of the finished pan. In other words, prior to the development of the present invention, shells could not be coated with an exterior finish and a logo could not be placed on the bottom of the shell prior to the attachment of the handle stud because such a process would require the factory worker to properly align the placement of the stud with the logo. This procedure is simply too time consuming and therefore too costly.

Although only one embodiment of the present invention has been illustrated and described, it will at once be apparent to those skilled in the art that variations may be made within the spirit and scope of the invention. Accordingly, it is intended that the scope of the invention be limited solely by the scope of the hereafter appended claims and not by any specific wording in the foregoing description.

We claim:

1. A method of attaching a stud to a cookware shell, the shell including a mark on an exterior surface of the shell for indicating the position where the stud is to be attached, the method comprising the following steps:

a. transporting the shell to a sensor;

b. rotating the shell so that the exterior surface of the shell passes in front of the sensor;

c. detecting the locating of the mark on the shell with the sensor:

d. welding a stud on the mark.

2. The method of claim 1 further comprising the following step between the locating (c) and welding (d) steps:

milling the exterior of the shell at the mark to provide a clean metallic surface for welding the stud thereto.

3. The method of claim 2 further comprising the following step after the welding (d) step:

testing the strength of the weld by applying torque to the stud.

4. The method of claim 3 further comprising the following step between the testing step:

attaching the handle to the stud.

5. A method of manufacturing cookware that includes a shell, a stud and a handle, the shell including a mark on an exterior surface of the shell for indicating the position where the handle is to be attached, the method comprising the following steps:

a. transporting the shell to a sensor;

b. rotating the shell so that the exterior surface of the shell passes in front of the sensor;

c. detecting the location of the mark on the shell with the sensor;

d. milling exterior surface of the shell at the location of the mark to provide a clean metallic surface for welding the stud thereto;

e. welding a stud on the milled mark;

f. testing the strength of the weld by applying torque to the stud;

g. attaching the handle to the stud.

6. An apparatus for welding a stud to a cookware shell, the shell including a mark on an exterior surface of the shell for indicating the position where the stud is to be welded to the shell, the apparatus comprising:

conveying means for transporting the shell to a means for sensing the presence of the shell;

means for lifting the shell so it is in alignment with a means for detecting the location of the mark;

means for rotating the shell in front of the means for detecting the location of the mark;

means for transporting the shell from the means for detecting the mark to means for milling the exterior of the shell at the location of the mark;

means for transporting the shell from the means for milling to means for welding a stud onto the shell at the milled mark;

means for transporting the shell from the means for welding to means for applying torque to the stud.

7. The apparatus of claim 6, wherein the means for lifting the shell includes a chuck for engaging the shell, the chuck including a vacuum line providing a suction engagement between the chuck and the shell.

8. The apparatus of claim 6, wherein the means for transporting the shell from the means for detecting to the means for milling is further characterized as a rotatable table.

9. The apparatus of claim 6, wherein the means for transporting the shell from the means for milling to the means for welding is further characterized as a rotatable table.

10. The apparatus of claim 6, wherein the means for transporting the shell from the means for welding to the means for applying torque is further characterized as a rotatable table.

* * * * *